United States Patent
Cherian et al.

(10) Patent No.: US 9,544,811 B2
(45) Date of Patent: Jan. 10, 2017

(54) SYSTEMS AND METHODS FOR BEACON TIMING ADJUSTMENT IN WIRELESS NETWORKS

(71) Applicant: QUALCOMM Incorporated, San Diego, CA (US)

(72) Inventors: George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 14/067,804

(22) Filed: Oct. 30, 2013

(65) Prior Publication Data

US 2014/0140208 A1    May 22, 2014

Related U.S. Application Data

(60) Provisional application No. 61/728,163, filed on Nov. 19, 2012.

(51) Int. Cl.
| | |
|---|---|
| *H04W 28/02* | (2009.01) |
| *H04W 24/02* | (2009.01) |
| *H04W 36/34* | (2009.01) |
| *H04W 56/00* | (2009.01) |

(52) U.S. Cl.
CPC ....... *H04W 28/0289* (2013.01); *H04W 56/002* (2013.01)

(58) Field of Classification Search
CPC ............. H04W 56/00; H04W 56/0015; H04W 56/0005; H04W 28/0289; H04W 28/02; H04W 28/0247; H04W 56/001; Y02B 60/50
See application file for complete search history.

(56) References Cited

U.S. PATENT DOCUMENTS

| | | | |
|---|---|---|---|
| 7,787,437 B2 | 8/2010 | Sakoda | |
| 2005/0195776 A1 | 9/2005 | Xu | |
| 2006/0009246 A1* | 1/2006 | Marinier | H04W 24/00 455/502 |
| 2006/0089138 A1 | 4/2006 | Smith et al. | |
| 2008/0056133 A1* | 3/2008 | Deshpande | H04W 52/0216 370/235 |
| 2008/0244069 A1 | 10/2008 | Funato et al. | |
| 2009/0097464 A1* | 4/2009 | Sakoda | H04W 48/08 370/338 |
| 2009/0103499 A1* | 4/2009 | Hofmann | H04W 36/30 370/336 |
| 2012/0044924 A1* | 2/2012 | Ji | H04J 3/0664 370/338 |

(Continued)

*Primary Examiner* — Ahmed Elallam
(74) *Attorney, Agent, or Firm* — Knobbe Martens Olson & Bear, LLP

(57) ABSTRACT

Systems, methods, and devices for communicating in a wireless network are provided. In some aspects, an access point for wireless communication a receiver configured to receive information identifying a beacon timing of a second access point. The access point further includes a processor configured to adjust a beacon timing of the access point based on the received information identifying the beacon timing of the second access point and a transmitter configured to transmit a beacon according to the adjusted beacon timing of the access point.

16 Claims, 11 Drawing Sheets

(56) References Cited

U.S. PATENT DOCUMENTS

| | | | |
|---|---|---|---|
| 2012/0250537 A1 | 10/2012 | Shatil et al. | |
| 2013/0040674 A1* | 2/2013 | Chang | H04W 56/0015 |
| | | | 455/502 |
| 2013/0235813 A1* | 9/2013 | Segev | H04W 72/044 |
| | | | 370/329 |
| 2013/0279438 A1* | 10/2013 | Kwon | H04W 72/0406 |
| | | | 370/329 |
| 2014/0119277 A1* | 5/2014 | Athankutty | H04W 88/06 |
| | | | 370/328 |

* cited by examiner

SYSTEMS AND METHODS FOR BEACON TIMING ADJUSTMENT IN WIRELESS NETWORKS

The present application claims priority to provisional U.S. Application Ser. No. 61/728,163, entitled "SYSTEMS AND METHODS FOR BEACON TIMING ADJUSTMENT IN WIRELESS NETWORKS," filed Nov. 19, 2012, assigned to the assignee hereof and incorporated herein by reference in its entirety.

BACKGROUND

Field

The present application relates generally to wireless communications, and more specifically to systems, methods, and devices for adjusting and distributing beacon timing in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The medium occupancy of a wireless channel may become congested due to a large number of wireless devices within the network sending and receiving communications. The result of large numbers of wireless devices attempting to communicate at the same time may include larger collision, latency, and power consumption. Thus, improved systems, methods, and devices for reducing congestion of the wireless communication medium are desired.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include decreasing medium occupancy of channels within a wireless communication medium.

One aspect of the disclosure provides an access point for wireless communication. The access point comprises a receiver configured to receive information identifying a beacon timing of a second access point; a processor configured to adjust a beacon timing of the access point to be offset from the beacon timing of the second access point based on the received information identifying the beacon timing of the second access point; and a transmitter configured to transmit a beacon according to the adjusted beacon timing of the access point.

Another aspect discloses an implementation of a method of wireless communication. The method comprises receiving information identifying a beacon timing of a second access point; adjusting a beacon timing of the access point to be offset from the beacon timing of the second access point based on the received information identifying the beacon timing of the second access point; and transmitting a beacon according to the adjusted beacon timing of the access point.

Another aspect discloses an access point for wireless communication. The access point comprises means for receiving information identifying a beacon timing of a second access point; means for adjusting a beacon timing of the access point to be offset from the beacon timing of the second access point based on the received information identifying the beacon timing of the second access point; and means for transmitting a beacon according to the adjusted beacon timing of the access point.

Another aspect discloses a computer program product comprising a computer-readable medium. The computer-readable medium comprises code for receiving information identifying a beacon timing of a second access point; code for adjusting a beacon timing of the access point to be offset from the beacon timing of the second access point based on the received information identifying the beacon timing of the second access point; and code for transmitting a beacon according to the adjusted beacon timing of the access point.

Another aspect discloses an access point for wireless communication. The access point comprises a transmitter configured to transmit a request frame to a wireless communication device requesting information identifying a beacon timing of a second access point; and a receiver configured to receive a beacon report including the information identifying the beacon timing of the second access point.

Another aspect discloses an implementation of a method of wireless communication. The method comprises transmitting a request frame to a wireless communication device requesting information identifying a beacon timing of a second access point; and receiving a beacon report including the information identifying the beacon timing of the second access point.

Another aspect discloses an access point for wireless communication. The access point comprises means for transmitting a request frame to a wireless communication device requesting information identifying a beacon timing of a second access point; and means for receiving a beacon report including the information identifying the beacon timing of the second access point.

Another aspect discloses a computer program product comprising: a computer-readable medium. The computer-readable medium comprises code for transmitting a request frame to a wireless communication device requesting information identifying a beacon timing of a second access point; and code for receiving a beacon report including the information identifying the beacon timing of the second access point.

DETAILED DESCRIPTION

Figure 1A:
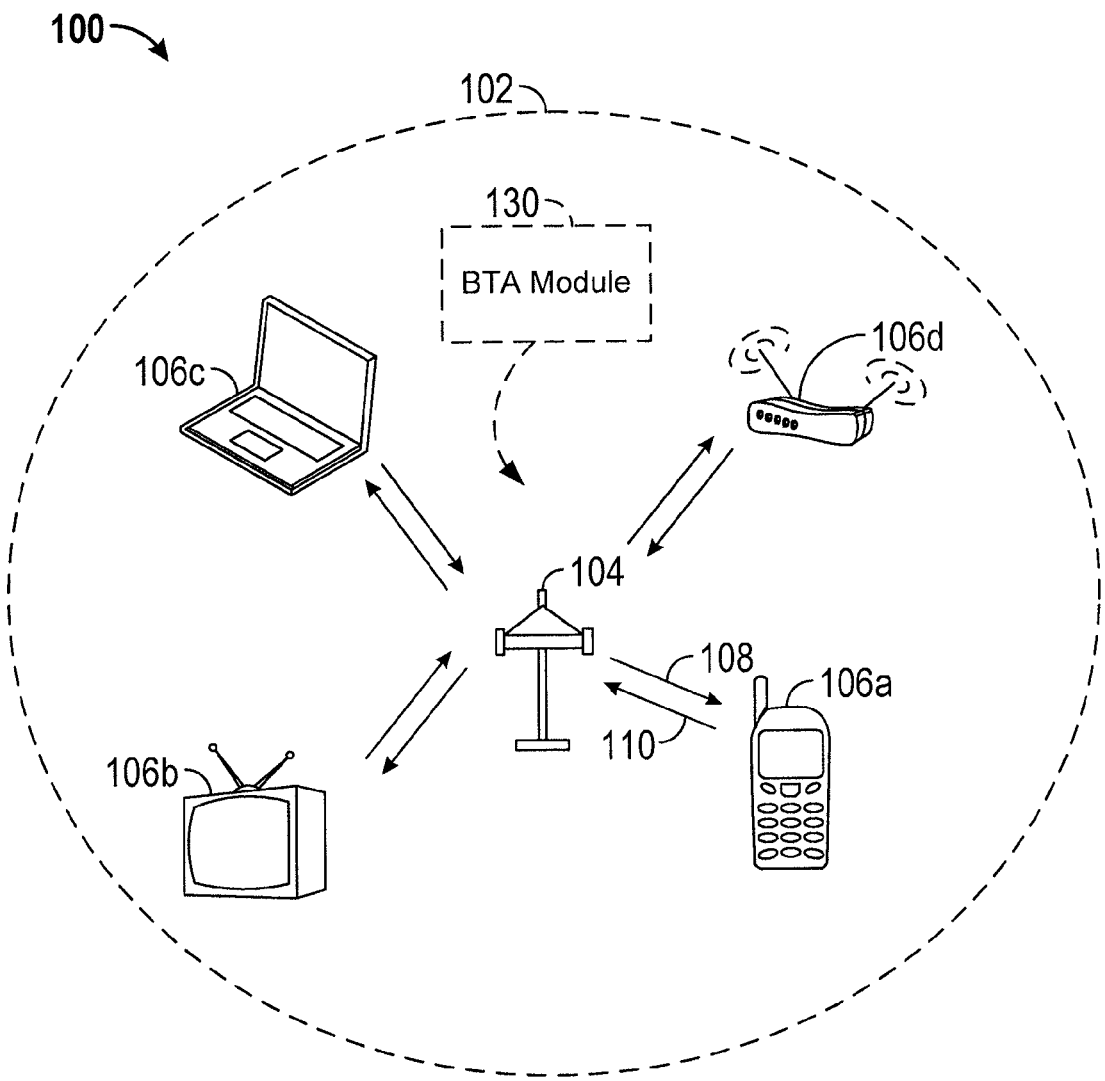
FIG. 1A illustrates an example of a wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim. In addition, the word "exemplary" is used herein to mean "serving as an example, instance, or illustration." Any embodiment described herein as "exemplary" is not necessarily to be construed as preferred or advantageous over other embodiments.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some aspects, certain of the devices described herein may further implement Multiple Input Multiple Output (MIMO) technology and be implemented as part of the 802.11ah standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S$ min $\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a wireless communication device, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1A illustrates an example of a wireless communication system 100 in which aspects of the present disclosure may be employed. The wireless communication system 100 may operate pursuant to a wireless standard, for example an 802.11 standard. The wireless communication system 100 may include an AP 104, which communicates with STAs 106a, 106b, 106c, and 106d (collectively STAs 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). Various BSSs may be further grouped or linked into an extended service set (ESS). An ESS may be created by linking a group of BSSs together with a backbone network so that coverage provided by each BSS overlaps with other BSSs. All of the APs 104 in the ESS may be given the same service set identifier (SSID) or network name. It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In accordance with the present disclosure, in a BSA 102 comprising multiple wireless devices, APs 106 may send frames for managing communications within the BSA 102, such as control and management frames, beacons, power save poll frames, clear to send frames, request to send frames, to name but a few. As will be discussed more thoroughly below, wireless medium occupancy may be higher after certain frames are transmitted by an AP 104 to one or more STAs 106. As such, a given BSA 102 may implement measures to more efficiently separate communications, providing a method for reducing data collisions. An embodiment of such a method disclosed herein may be beacon time adjustment ("BTA"), allowing multiple wireless devices to temporally separate target beacon transmission times ("TBTT"). In at least one embodiment, a BTA module 130 (described in greater detail below) may be implemented into a wireless device or multiple wireless devices in a network, such as AP 104 and STAs 106 in order to dynamically or statically adjust target beacon transmission times, as disclosed herein.

Figure 1B:
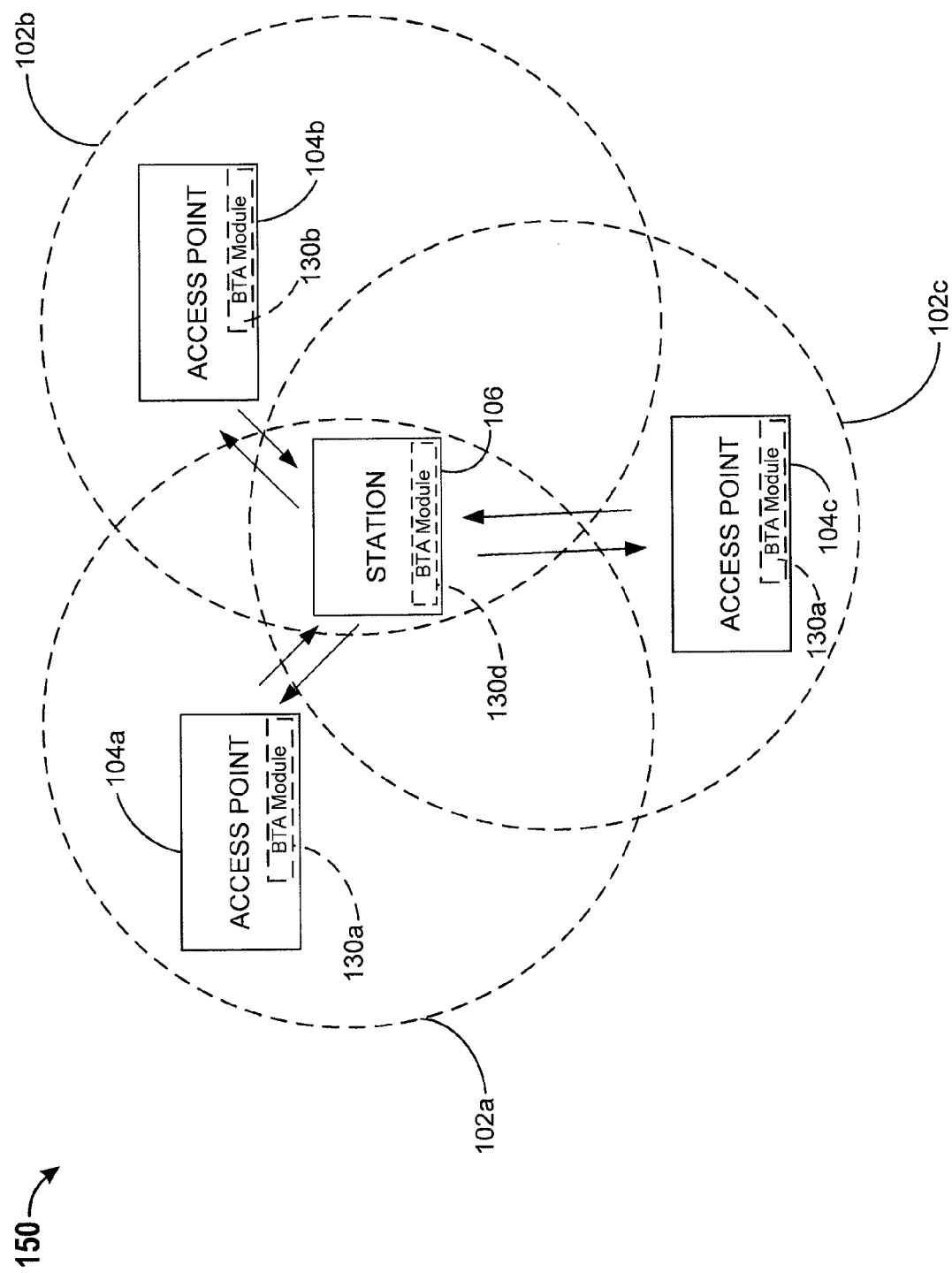
FIG. 1B illustrates another example of a wireless communication system in which aspects of the present disclosure may be employed.

FIG. 1B illustrates an example of a wireless communication system 150 in which aspects of the present disclosure may be employed. The wireless communication system 150 may operate pursuant to a wireless standard, such as the IEEE 802.11 protocol. The wireless communication system 150 may include a first AP 104a, including a basic service area (BSA) 102a, a second AP 104b, having a BSA 102b, and a third AP 104c, having a BSA 102c. The wireless communication system 150 also includes a station 106, which is within the BSA of each of the APs 104a, 104b, and 104c. The wireless communication system 150 may make up an ESS that includes a specific SSID. In some embodiments, APs 104a, 104b, and 104c may communicate with the STA 106 as shown in an uplink and a downlink direction. In some embodiments, APs 104a, 104b, and 104c may communicate with each other, for example over a back-haul network (not shown). The STA 106 may associate with one of the three APs, such as AP 104a, in order to have access to the network services offered by the wireless communication system 150. In order for the network to function, the APs may learn information relating to STAs that are associated with the other APs. Further, each AP may inform the other APs of STAs that are associated therewith.

In managing the association of multiple STAs 106, or APs 104 within a communications system 150, when multiple wireless devices are communicating on the same medium, the medium occupancy increases, increasing the occurrence of data collisions. A method for reducing medium occupancy as disclosed herein may be accomplished by the operation or cooperation of one or more of the STAs 106 or the APs 104. As disclosed herein, a BTA module 130a-130d may be implemented within each wireless device and interact with the processor or controller, enabling control and/or adjustment of beacon signal timing and/or scheduling. The functions of the BTA modules 130 may be enabled through the use of specific coding within the wireless devices or through the use of various computer processes. In an embodiment, control of beacon timing may be accomplished either by centralized control by an AP 104 or decentralized control by multiple APs 104 and STAs 106.

Figure 2:
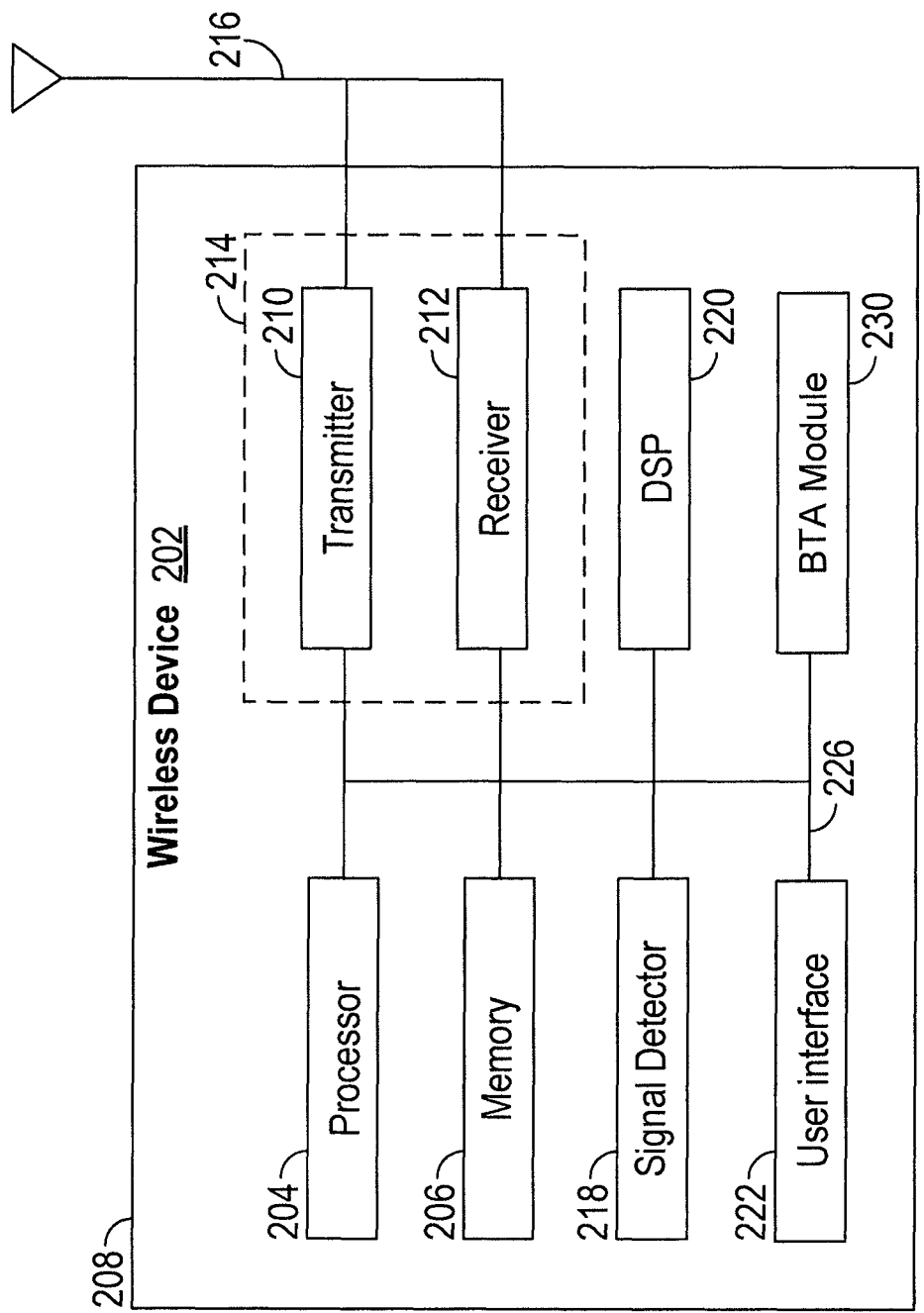
FIG. 2 shows a functional block diagram of an exemplary wireless device that may be employed within the wireless communication system of FIG. 1A or FIG. 1B.

FIG. 2 illustrates various components that may be utilized in a wireless device 202 that may be employed within the wireless communication system 100 or the wireless communication system 150. The wireless device 202 is an example of a device that may be configured to implement the various methods described herein. For example, the wireless device 202 may comprise the AP 104 or one of the STAs 106 of FIG. 1A. Alternatively, the wireless device 202 may comprise either the AP 104a or the AP 104b, or the STA 106 of FIG. 1B.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of medium access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (e.g., DSP 220, 320, 420, discussed below), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header types. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user. In an embodiment, when implemented as an AP 104, the wireless device 202 may further comprise a BTA module 230 as mentioned above. BTA module 230 may be useful in association with high occupancy medium environments such as communication system 150 wherein multiple wireless devices 202 are attempting to communicate simultaneously. BTA module 230 may be a component incorporated within the processor or implemented as instructions (code) to the processor stored in the memory 206. BTA module 230 may further be included in the wireless device and may further operate in conjunction with DSP 220 and signal generator 218, allowing the wireless device 202, implemented as an AP 104, to adjust a beacon timing of the AP 104 based, at least in part, on the information received from other wireless devices identifying the beacon timing of the second access point AP2. This beacon timing may dynamically adjusted within system 150 in order to minimize collisions with the beacons of other wireless devices 202, increasing efficiency, and reducing medium occupancy and power and data loss.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218, the DSP 220, and/or the BTA module 230. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive communications having a plurality of MAC header types.

Figure 3:
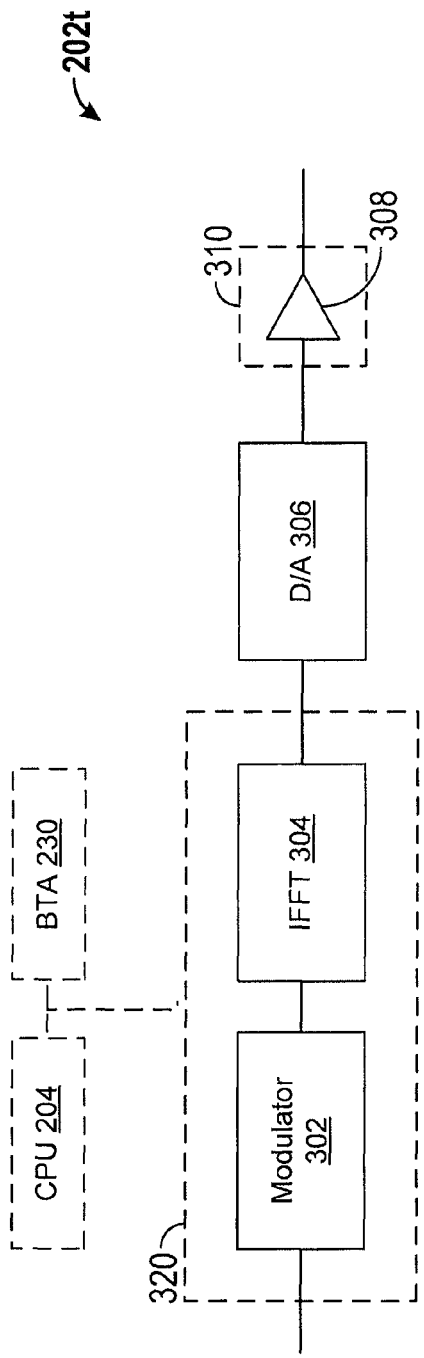
FIG. 3 shows a functional block diagram of exemplary components that may be utilized in the wireless device of FIG. 2 to transmit wireless communications.

The wireless device 202 may comprise an AP 104 or a STA 106, and further be used to transmit and/or receive communications. FIG. 3 illustrates various components that may be utilized in the wireless device 202t to transmit wireless communications. The components illustrated in FIG. 3 may be used, for example, to transmit OFDM communications. In some aspects, the components illustrated in FIG. 3 are used to generate and transmit packets to be sent over a bandwidth of less than or equal to 1 MHz.

The wireless device 202t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation or network. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202t (e.g., see description above with reference to FIG. 2). In some aspects, the processor 204 may further operate in conjunction with the BTA module 230, allowing beacon time adjustment information to be included within transmissions and communicated within the network. The dashed lines shown in FIG. 3 indicate the possible cooperation of these various components.

As discussed above, the DSP 320 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 202t may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA). In accordance with at least one aspect of the present disclosure, the analog signal may further comprise a beacon and beacon timing information provided at least in part by the BTA module 230. In some aspects, this beacon timing information may be included in transmissions from the device 202t.

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

Figure 4:
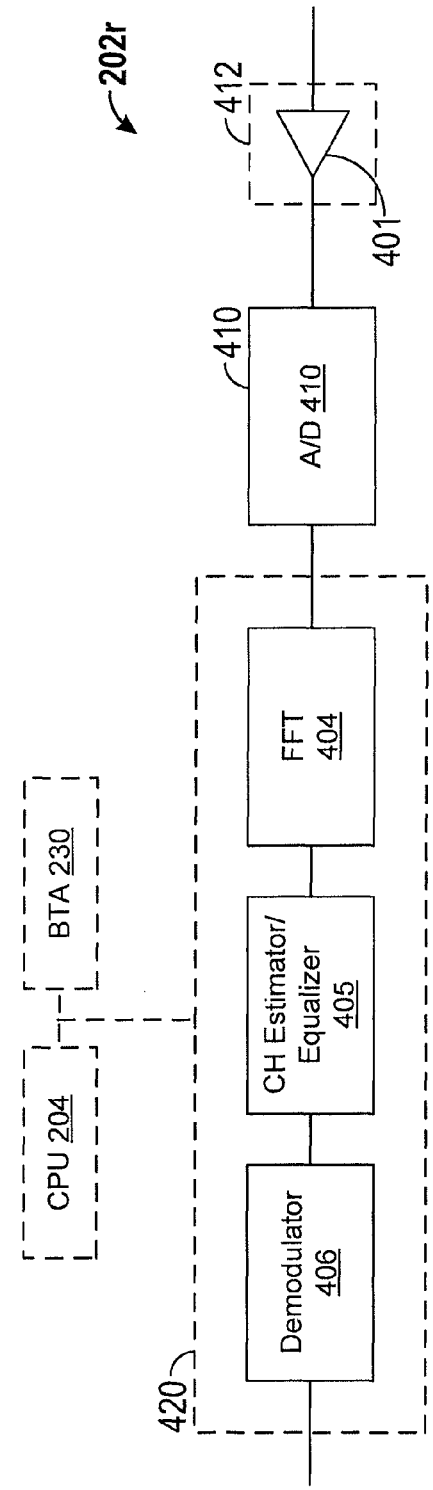
FIG. 4 shows a functional block diagram of exemplary components that may be utilized in the wireless device of FIG. 2 to receive wireless communications.

FIG. 4 illustrates various components that may be utilized in the wireless device 202 of FIG. 2 to receive wireless communications, generally designated 202r. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 202r is configured to receive one or more packets or data units in a wireless signal. Data units that may be received and decoded or otherwise processed as discussed below. As disclosed herein, such received packets or data units may comprise a beacon signal, further implementing the beacon transmit adjustment processes provided by the BTA feature 230.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 202r. In some aspects, the analog to digital converter 410 is implemented in the transceiver 214 (FIG. 2) or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses.

The wireless device 202r may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 202r may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 202 (FIG. 2).

Similar to above with respect to FIG. 3, processor 204 and BTA module 230 may also interact with the DSP 420 and the received signal, providing a input for the adjustment of the device's 202r beacon transmission time or data content. Device 202r may also receive beacon signals from other wireless devices 202t and utilize received beacon timing information in the selection or adjustment of its own beacon timing, as discussed further, below.

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, such as beacon signals, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Medium Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 202t shown in FIG. 3 shows an example of a single transmit chain to be transmitted over an antenna. The wireless device 202r shown in FIG. 4 shows an example of a single receive chain to be received over an antenna. In some implementations, the wireless device 202t or 202r may implement a portion of a MIMO system using multiple antennas to simultaneously transmit data.

As discussed above, the medium occupancy of a wireless channel may become congested when a large number of wireless devices within the network attempt to send and/or receive communications. Wireless devices within the network send frames for managing communications within the network (e.g., control and management frames, such as acknowledgement (ACK) frames, beacons, power save poll frames, clear to send frames, request to send frames, etc.). Medium occupancy may be higher after certain frames are transmitted from an AP to a STA (or from one STA to another STA in a peer-to-peer type network). For example, the medium occupancy of a channel after the transmission of a beacon signal may be higher than the medium occupancy prior to transmission of the beacon signal.

An AP 104 may transmit a beacon signal (or simply a "beacon"), via a communication link such as the downlink 108, to other STAs 106 of the system 100, which may help the other STAs 106 to synchronize their timing with the AP 104, or which may provide other information or functionality. Such beacons may be transmitted periodically so that the STAs 106 within the network will know when a subsequent beacon will be received. The time that a beacon will be transmitted by an AP or STA (e.g., in a peer-to-peer or ad hoc network) may be referred to as a target beacon transmission time ("TBTT"). In some aspects, the target beacon transmission time of each beacon may be announced in the previously transmitted beacon. In some aspects, the time between each beacon transmission may not change from beacon to beacon and may remain fixed for a period of time. In some aspects, the period between successive transmissions of a beacon may be referred to as a beacon interval and may include a number of time units between the successive transmissions of the beacon. Transmission of a beacon may be divided into a number of groups or intervals. Beacons may further be adjusted for beacon interval and TBTT as required by a system 150 or a give wireless device 202 according to medium occupancy levels, data loss, and the methods disclosed herein.

A beacon may include various information about the wireless network. In some aspects, a beacon may include information both common (e.g. shared) amongst several devices and/or information specific to a given device. For example, the beacon may include, but is not limited to, information for synchronization of APs and STAs and also information about data that is available for STAs on the network. For example, a beacon may include, but is not limited to, such information as timestamp information to set a common clock to which all STAs may be synchronized, a peer-to-peer network identifier, a device identifier, capability information, a beacon interval duration, transmission direction information, reception direction information, a neighbor list, and/or an extended neighbor list, some of which are described in additional detail below. In some aspects, the beacon may include information informing STAs 106 that may be in a power save mode that data is buffered for the STAs 106 at the AP 104.

In some aspects, a STA 106 may be required to associate with the AP 104 in order to have access to the network services offered by the wireless communication system using the AP 104. The STA 106 may only be able to associate with a single AP at a time, and must disassociate from that AP before associating with another AP. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. In some aspects, the STA 106 may use the signal strength of the beacon to decide when to associate with a specific AP and/or when to disassociate from another AP (e.g., because of diminishing channel conditions). After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Accordingly, in certain wireless communication systems 100, the AP 104 may transmit paging messages within a beacon to a plurality of STAs 106 that are in a power save mode, the paging messages indicating whether or not there is data buffered at the AP 104 for the STAs 106. The STAs 106 may use this information to determine when to transition to an awake state or a doze state. For example, if a STA 106 determines it is not being paged, it may enter a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure.

In some aspects, a beacon (e.g., a paging message within the beacon) may include a traffic identification map (TIM) with a bitmap (not shown in this figure). In certain such aspects, the bitmap may include a number of bits. In some aspects, paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate the state the corresponding STA 106 should be in (e.g., doze state or awake state) to be able to receive Buffered Units (BUs) that the AP 104 has for that particular STA 106. Accordingly, the size of the bitmap may be directly proportional to the number of STAs 106 in the wireless communications system 100. Therefore, a large number of STAs 106 in the wireless communications system 100 may result in a large bitmap.

In some aspects, STAs 106 that sleep for a long time may not wake up to read an incoming TIM broadcast message. For example, a STA 106 may be configured to sleep through one or more TIM messages in an extended sleep mode. In this case, the STA 106 may previously have negotiated and advertised to the AP 104 that the STA 106 may not read any TIM messages. Accordingly, the AP 104 may not include the corresponding identifiers in the TIM message. In various implementations, the STAs 106 can notify the AP 104 that they may not wake up for one or more TIM messages (e.g. that they are operating in the aforementioned power saving mode) using a control message, or immediately during association.

For STAs 106 that have notified the AP 104 in this manner, the AP 104 may not include identifiers in the TIM message, even when it has BUs intended for them. STAs 106 may claim their BUs by sending a PS-Poll at any time to the AP 104. In an implementation, AP 104 may immediately send the BU in response to the PS-Poll. In another implementation, the AP 104 may respond to the PS-Poll with an acknowledgement (ACK), and deliver the BU at a later time. In yet another implementation, the AP 104 may not immediately respond (neither with ACK nor with BU) to a PS-Poll. The AP 104 may instead reply with a Cumulative ACK frame sent after a given scheduled time after the TIM message.

In various implementations, the STA 106 can specify the waiting time to deliver the BU via the PS-Poll (for a dynamic indication), an association request, a probe request, and/or another management frame sent to the AP 104 (for a static indication). In other implementations, the AP 104 can specify the waiting time to deliver the BU via an acknowledgement (ACK or ack) frame, a TIM element (for a dynamic indication), a beacon, an association response, a probe response, or other management frames sent to the STA 106 (for a static indication). The STA 106 may go to sleep for the waiting time duration. The STA 106 may acknowledge correct reception of the BU by sending an ACK. The STA 106 may then go back to sleep. In some aspects, the STA 106 may not go back to sleep until it receives a beacon notifying the STA 106 that its specified bit in the TIM is clear, thus indicating that the STA 106 has received the last buffered frame of data.

As described above, the medium occupancy of a channel after the transmission of a beacon signal may be higher than the medium occupancy prior to transmission of the beacon signal. Higher medium occupancy may be due to that fact that any STAs 106 that are operating in the PS-Poll mode are informed of the availability of downlink data buffered at the AP 104 using the TIM bits in the beacon and further because applications in the STAs 106 often have a larger downlink traffic volume than the uplink. Furthermore, in an area involving a dense AP deployment with many APs operating on the same channel and transmitting beacons close in time, STAs connected to the different APs may contend for the medium at the same time. As a result, larger collision, latency, and power consumption may occur. Accordingly, aspects disclosed herein relate to adjusting the timing of beacons to distribute the beacon transmissions so as to reduce the medium occupancy of the channel and thus reduce collision, latency, and power consumption.

In some aspects, one or more APs 104 may learn information about the beacon timing of neighboring APs 104 and may adjust the timing of beacon transmissions on the network based on the learned information. For example, one or more APs 104 may adjust the phase of their target beacon transmission time. As a result, beacon transmissions may be distributed across the communication channel at different times and fewer STAs 106 will contend for the medium during the same times. In some aspects, each AP 104 in a network (e.g., in an extended service set (ESS), a group of basic service sets (BSSs), etc.) may learn about the beacon timing of neighboring APs 104 and may individually adjust their own beacon timing. In some aspects, an AP 104 acting as a centralized coordinator may learn about the beacon timing of most or all of the APs 104 within the network and may request the APs 104 to transmit beacons at various adjusted times.

Figure 5:
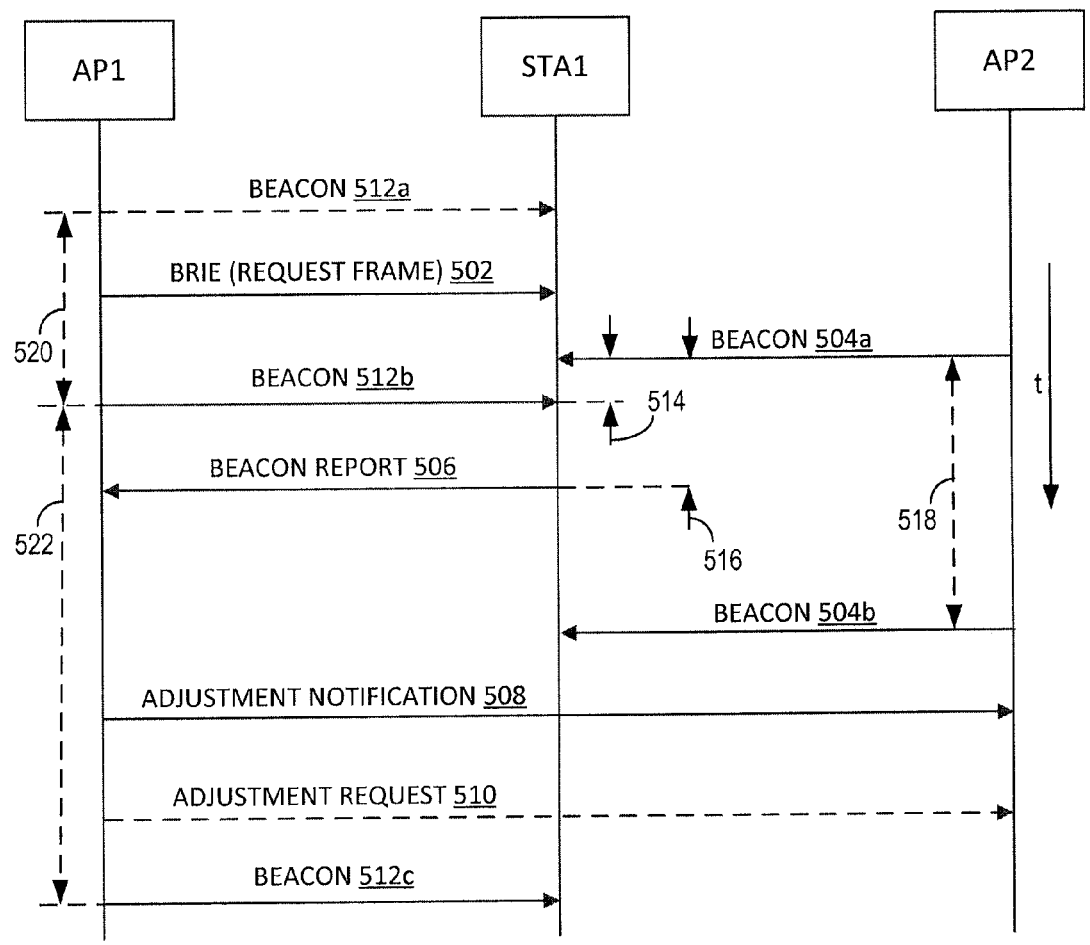
FIG. 5 illustrates an exemplary signal flow diagram illustrating signal flow exchanged among entities illustrated in FIG. 1A and/or FIG. 1B.

FIG. 5 illustrates an exemplary signal flow diagram illustrating signal flow exchanged among exemplary entities illustrated in FIG. 1A and FIG. 1B, wherein time progresses from the top of the page to the bottom, as indicated at the right. The signal flow illustrated in FIG. 5 depicts a mechanism for a first AP (AP1) to request information relating to other neighboring APs (e.g., AP2) in a network, such as communications system 150. The AP1 may solicit beacon reports 506 from various STAs (e.g., STA1) that are associated with the AP1 in order to learn information relating to other APs on the network, including information relating to the beacon timing of the other APs. The beacon reports may provide the AP1 with enough information so that the AP1 may adjust its beacon timing and/or influence the adjustment of the beacon timing of other neighboring APs. For example, AP1 transmits a request frame 502 to a first STA (STA1), which is associated with AP1. The request frame 502 requests the STA1 to report information that the STA1 observes or receives from the neighboring APs, including information identifying beacon timing of the neighboring APs, such as beacon interval 518 of AP2. In some aspects, the request frame 502 may be included in a beacon report information element ("BRIE") that is added to a neighbor report request frame (not shown). A neighbor report request frame may be used by a STA1 or an AP1 to obtain information about neighboring APs, e.g., AP2, with respect to the associated AP2's beacon time or that of other neighboring APs. Receipt of the beacon report information element and request frame 502 may prompt the STA1 to monitor AP2 or other neighboring APs for the information that is to be used for generation of a beacon report 506.

In some aspects, the STA1 may periodically monitor neighboring APs in order to retrieve beacons from neighboring APs without being prompted (such as a request frame 502) by another device. For example, STA1 may periodically receive beacons 504 from other APs on the network and may save information identifying the beacon timing of the APs based on the received beacons, such as beacons 504. For example, STA1 receives a beacon 504a from AP2. In response to receiving the beacon 504a, the STA1 may determine when a most recent beacon 512a (shown as a dashed line) has been received from AP1, for example. The STA1 may then determine the information identifying the beacon timing of the STA2, including the times at which beacons 504 are transmitted and the beacon interval 518, among other possible information. This may be typical of information that is to be included in a beacon report 506 based on the received beacons 504, 512. For example, the information identifying the beacon timing of the AP2 may include a time offset 514 between receipt of beacon 504a and beacon 512b received from the AP1 and the AP2 and/or a time lapse 516 since the STA1 last received the beacon from the AP2. It should be appreciated by those skilled in the art that multiple references may be used to indicate a time offset 514, a time lapse 516, or other relevant time. The information identifying the beacon timing offset 514 or lapse 516 for inclusion in the beacon report 506 will be described in further detail below.

In some aspects, the STA1 may further determine other information related to the AP2. For example, the STA1 may determine a basic service set identifier (BSSID), such as a MAC address used by the AP2, relating to the basic service set (BSS) of the STA1 and AP2. For example, the BSSID relating to the AP2 may be included in the beacons 504 transmitted by the AP2. The information determined by the STA1 may further include a service set identifier (SSID) assigned to other neighboring APs on AP2's network, which may also be included in the beacon 504a transmitted by AP2. The information may further include additional data, such as a received signal strength indication (RSSI), or a received channel power indication, indicating the amount of power present in the signal being received from AP1 by AP2. In some aspects, the signal strength indication or channel power indication may include a value representing the signal power and may be determined by the STA1.

Once the STA1 has determined the information relating to the AP2, a beacon report 506 may be transmitted to the AP1. For example, the beacon report 506 may include the BSSID, the SSID, the RSSI, and the information identifying a beacon timing (e.g., offset 514, lapse 516) or beacon interval 518 of AP2. In the event beacon report 506 is broadcast to additional devices within range, beacon report 506 may further include information about AP1, such as BSSID, the SSID, the RSSI, beacon timing, and/or beacon interval 520. In some aspects, the BSSID, the SSID, and/or the RSSI as indicated by AP2 may be used by the AP1 to identify the specific neighboring APs for which the beacon timing refers. In some aspects, the beacon report 506 may be included in a beacon report information element (not shown) that is added to a neighbor report response frame so that the AP1 may recognize that a beacon report 506 is included in the signal from the STA1.

After receiving the beacon report 506, the AP1 may adjust its beacon timing and/or prompt the adjustment of the beacon timing of other neighboring APs based on the information included in the beacon report 506 in order to create a new target beacon transmission time for the AP1 (e.g., beacon 512c, described below), AP2, and/or other neighboring APs. For example, each AP within the network may learn about the beacon timing of neighboring APs and may individually adjust their own beacon timing in effort to minimize data conflicts and reduce medium occupancy. As another example, a given AP acting as a centralized coordinator may learn about the beacon timing of other APs within the network and may prompt the other APs to adjust their beacon timing. For example, AP1 may transmit an adjustment request 510 signal to the AP2 prompting the AP2 to adjust its beacon timing. The new target beacon transmission times indicated or requested by the adjustment request 510 may lead to better distribution of the beacon transmission across the network. For example, the AP1 may adjust its beacon timing so that its beacon is transmitted at a specific time that is farthest in time from all neighboring beacon transmissions. As another example, the AP1 may adjust its beacon transmission timing by shifting the beacon timing by a random or predetermined amount of time relative to the current beacon timing. The shift may include a single large random time shift. As another example, the AP1 may adjust its beacon transmission timing by repeatedly shifting the beacon timing by a shift duration (FIG. 9) over multiple time shift intervals for a period of time until a final target beacon transmission time is achieved. Details regarding different techniques for adjusting the beacon timing will be discussed further below.

Alternatively, in some aspects, AP1 may autonomously adjust its own beacon timing. Prior to adjusting beacon timing to a new target beacon transmission time and/or transmitting an adjustment request 510 signal, an AP1 may send an adjustment notification 508 or other similar advertisements to all STAs within the network and/or to all APs within the network notifying them that the AP1 intends to change its beacon timing to a new target beacon transmission time. All other APs within the network that are also going to adjust their beacon timing may also send notifications 508 to the other STAs and/or APs on the network. The adjustment notification 508 may ensure that all APs do not adjust their beacon timing simultaneously and that all STAs and APs will be notified of the adjusted beacon timing for the associated AP. The adjustment notification 508 from AP1 may include the time at which the transition to the new target beacon transmission time will be applied and the time offset of the new target beacon transmission time relative to the current target beacon transmission time. As a nonlimiting example, following beacon adjustment notification 508, AP1 may determine a new target beacon transmission time and adjust its beacon interval to interval 522 and transmit beacon 512c at the newly determined beacon timing.

Advantageously, this may function to reduce medium occupancy and increase efficient transmission of data and control signals through adaptive distribution of TBTTs. For example, the AP1 may transmit an adjustment notification 508 to all STAs on the network (not shown). In such and embodiment, the AP1 may broadcast an adjustment notification 508 to all available nodes, as opposed to directly transmitting (unicast/multicast) the adjustment notification to the AP2. The STAs may then notify the APs with which they are associated via a beacon report 506 or similar, that the beacon timing of AP1 is going to be adjusted.

In another example, AP1 may transmit an adjustment notification 508 directly to the AP2 and all other APs on the network, such as via a backhaul communication (e.g., using the Internet or a public switched telephone network (PSTN)). In this example, the AP1 may also transmit an adjustment notification 508 to the STAs on the network so that all APs and STAs are notified that an adjustment of the beacon timing of AP1 will occur.

In some aspects, the adjustment notification 508 may be sent by each AP at a predetermined time prior to the APs actually applying the adjustment to their beacon timing. For example, an AP may start advertising the new beacon timing by sending adjustment notifications 508 early enough so that all STAs that are in sleep mode (e.g., power save (PS) mode) and/or have negotiated a waiting time duration (e.g., a sleep duration or listen interval spanning multiple target beacon transmission times) will be notified about the upcoming adjusted beacon timing. Otherwise, if an adjustment notification 508 is sent only at one time, then STAs that are asleep during that time may not receive the adjustment notification 508 and fail to be notified of the planned beacon timing adjustment. Accordingly, an AP1 or AP2 may be required to advertise the upcoming beacon timing adjustment by sending notifications for at least the maximum sleep duration or "listen interval" negotiated by the various STAs within the network. Transmitting notifications for at least the maximum sleep duration may ensure that all STAs within range receive the adjustment notification 508 and be notified of the upcoming AP1 beacon timing adjustment.

As described above, prior to transitioning from a current beacon timing to a new adjusted beacon timing, AP1 may begin advertising the new target beacon transmission time by sending periodic adjustment notifications 508. The adjustment notification 508 may include the time at which the transition to the new target beacon transmission time will be applied and the time offset of the new target beacon transmission time relative to the current target beacon transmission time. In some aspects, the adjustment notification 508 may be included in an adjustment notification information element (not shown) that is added to a beacon or may be included in a beacon adjustment management frame.

It is to be appreciated by those skilled in the art that the order and timing of the various beacons, reports, or requests, etc., shown in FIG. 5 are not to be considered limiting. The lines representing signals may vary in order of operation as dictated by transmission path characteristics, device reporting, beacon intervals, beacon timing adaptation, and the various members of the network, among many other factors.

Figure 6:
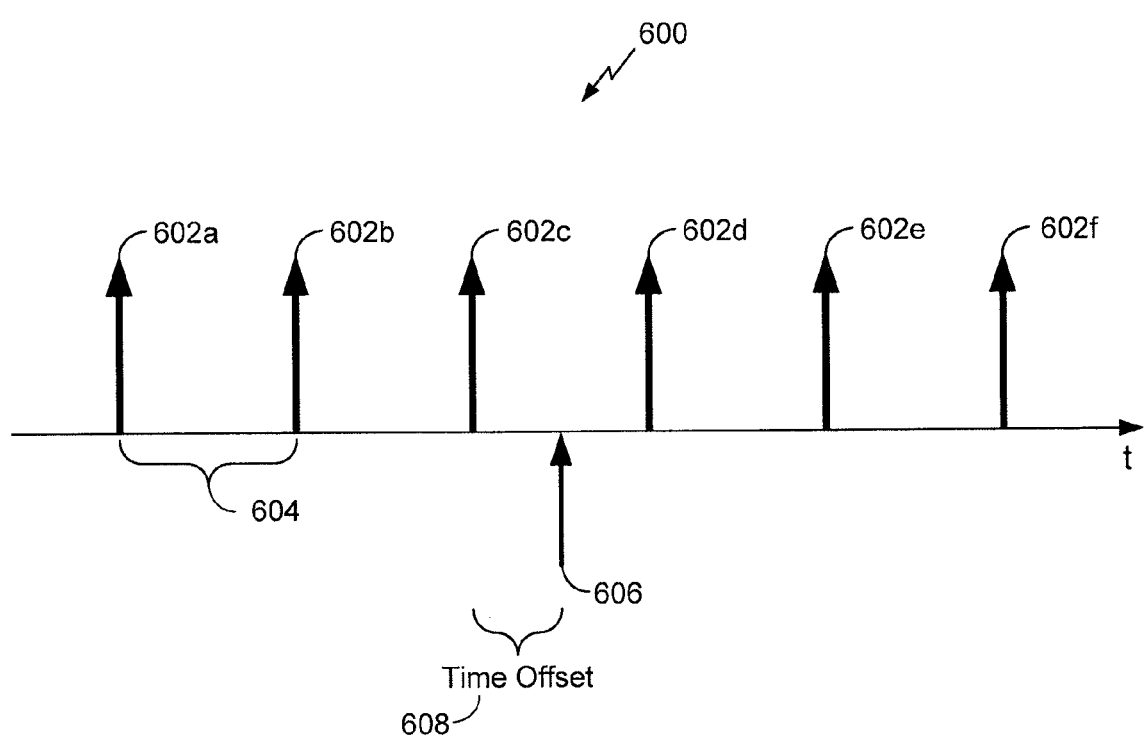
FIG. 6 illustrates an exemplary communication timeline in a wireless communication system in accordance with aspects of the present disclosure.

FIG. 6 illustrates an exemplary communication timeline 600 in a wireless communication system where devices may communicate via a communications channel. Time increases horizontally to the right across the page over the time axis (t). Each vertical arrow indicates the transmission of a beacon, and is referred to by individual target beacon transmission times, such as beacon 602a-602f, 606. The exemplary communication timeline 600 may include a beacon interval 604, indicating the time between transmission of beacons 602a, 602b. As shown, beacon interval 604 may be applied to, or between, all of the beacons 602. A first AP (e.g., AP1 of FIG. 5) transmits a beacon to a STA (e.g., STA1) at a target beacon transmission time 602 at the end of each beacon interval 604. In some aspects, the duration of beacon interval 604 may vary over time. In such aspects, the target beacon transmission time of each beacon may be announced in the previously transmitted beacon so that the STA knows when a subsequent beacon will be transmitted. In other aspects, the duration of the beacon interval 604 may remain fixed over a period of time. In such aspects, the STA will be able to predict that a beacon will arrive at each fixed beacon interval 604. FIG. 6 also depicts a second beacon being transmitted by an AP (e.g., AP2) to a beacon to a STA at target beacon transmission time 606.

In response to a request frame transmitted from the first AP requesting the STA to report information observed from the second AP (a neighboring AP), the STA may observe the beacon transmitted at the target beacon transmission time 606 and determine information identifying a beacon timing of the second AP. As illustrated in FIG. 6, the STA determines the information identifying the beacon timing of the second AP including a time offset 608 between the beacon received at the target beacon transmission time 602 from the first AP and the beacon transmitted at the target beacon transmission time 606 from the second AP. In some aspects, the information identifying the beacon timing of the second AP that is determined by the STA may include a time lapse (e.g., time lapse 516) since the STA last received a beacon from the second AP. As described above, the STA may also determine other information based on signals received from the second AP, including a BSSID, a SSID, and a RSSI. The STA may transmit the information to the first AP in a beacon report 506 so that the first AP may adjust its beacon timing accordingly.

Figure 7:
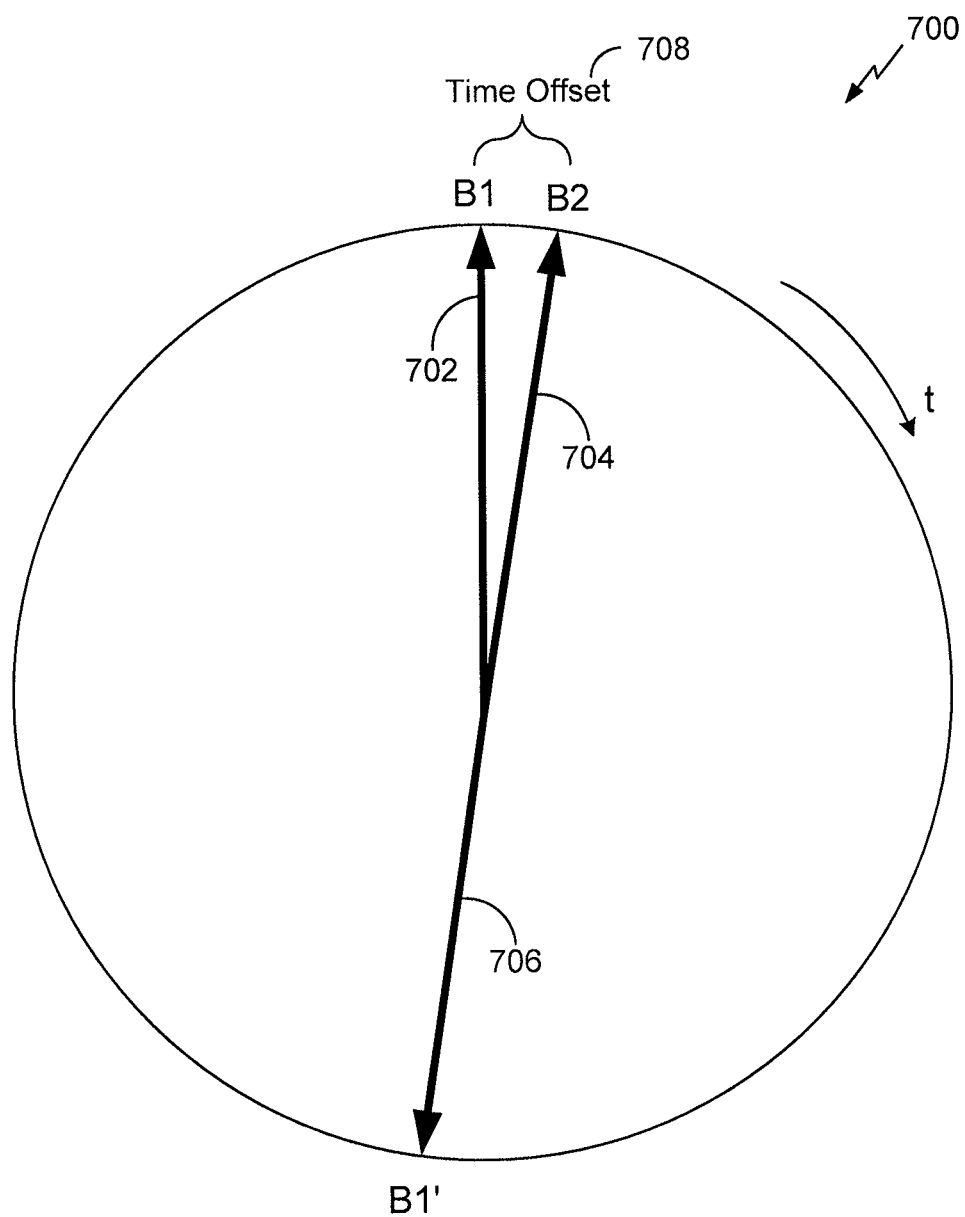
FIG. 7 illustrates an exemplary technique for adjusting a target beacon transmission timing of an access point.

After receiving beacon reports from one or more STAs, the AP may use various techniques to adjust its beacon transmission timing. The techniques may be used to avoid more than one AP shifting their beacon timing to the same transmission time. FIG. 7 illustrates one exemplary technique for adjusting target beacon transmission timing of an AP, such as AP1 described in FIG. 5. Time increases clockwise around a beacon timing cycle, generally designated 700. In FIG. 7, an original target beacon transmission time B1 of a beacon (e.g., 512a) transmitted from a first AP1 is illustrated by arrow 702. A target beacon transmission time B2 of a beacon (e.g., 512b) transmitted from a second, neighboring AP (e.g., AP2) is illustrated by arrow 704. AP1 may receive a beacon report 506 from a STA1 including information identifying the beacon timing of the second AP2, including the determined time offset 708 between the beacon transmitted at time B1 and the beacon transmitted at time B2. Time offset 708 may further be analogous to time offset 514 of FIG. 5. AP1 may determine whether to adjust its target beacon transmission time based on the time offset 708. For example, if the time offset 708 is large enough, AP1 may determine that an adjustment of its target beacon transmission time is not necessary. If AP1 determines that an adjustment is needed, it may adjust its target beacon transmission time so that its beacon 512 is transmitted at a time B1' that is separated by a period of time from the target beacon transmission time B2 of the second neighboring AP2.

As shown, the time B1' at which the beacon 512c is transmitted is represented by arrow 706. For example, the first AP may adjust its beacon timing to target beacon transmission time B1' so that B1' is as far apart from B2 as possible. For example, the beacon timing may be adjusted so that the target beacon transmission time is a minimum threshold distance from B2, which may be based on various factors including the number of APs transmitting beacons on the network, the distance in time between transmissions of the beacons from the various APs, etc. In some aspects, when more APs are present within the network than AP1 and AP2, AP1 may adjust its target beacon transmission time to be as far apart as possible from the beacon transmission times of all of the other APs based on beacon reports with information identifying the beacon timing of the other APs. In some embodiments, STAs associated with neighboring APs that observe the new beacon timing of the first AP may report the new beacon timing to the neighboring APs so that these APs will be aware of neighboring AP beacon timing and refrain from adjusting their beacon to the same new timing. In some embodiments, AP1 may request the STAs to report the new beacon timing advertisement made by neighboring APs before AP1 starts advertising its new timing.

Figure 8:
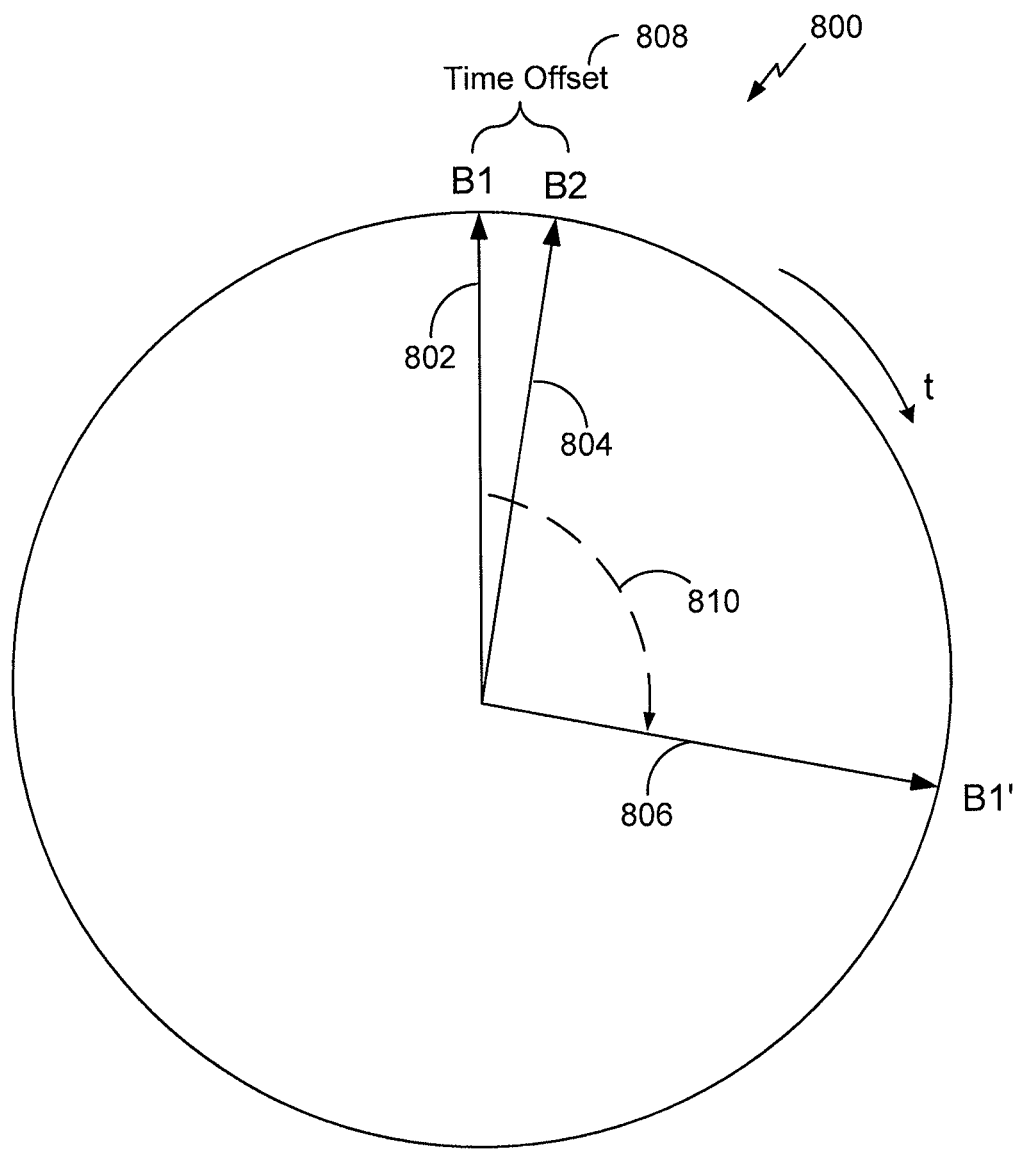
FIG. 8 illustrates another exemplary technique for adjusting a target beacon transmission timing of an access point.

FIG. 8 depicts a timing diagram indicating a beacon timing cycle, generally designated 800, further illustrating another exemplary technique for adjusting target beacon transmission timing of an AP. Time increases clockwise around the timing diagram. An original target beacon transmission time B1 of a beacon 512a transmitted from AP1 is illustrated by arrow 802. A target beacon transmission time B2 of a beacon transmitted from a second neighboring AP2 is illustrated by arrow 804. A beacon report 506 may be received by AP1 from a STA1 that includes information identifying the beacon timing of AP2, including the time offset 808 between the beacon transmitted at time B1 and the beacon transmitted at time B2. As described above, AP1 may determine whether to adjust its target beacon transmission time based on the time offset 808. If AP1 determines that an adjustment is necessary, it may adjust its beacon timing by shifting the target beacon transmission time B1 by a time shift 810. Time shift 810 may be implemented as a single large random or predetermined shift represented as a time duration or phase shift, relative to the original beacon time B1, to adjusted target beacon transmission time BF represented by arrow 806. In some aspects, after the time shift 810 is applied to the target beacon transmission time B1, the AP1 may determine whether any time offsets between its adjusted target beacon transmission time BF and the target beacon transmission time of any other APs is within a particular threshold and may apply another shift adjustment accordingly.

Figure 9:
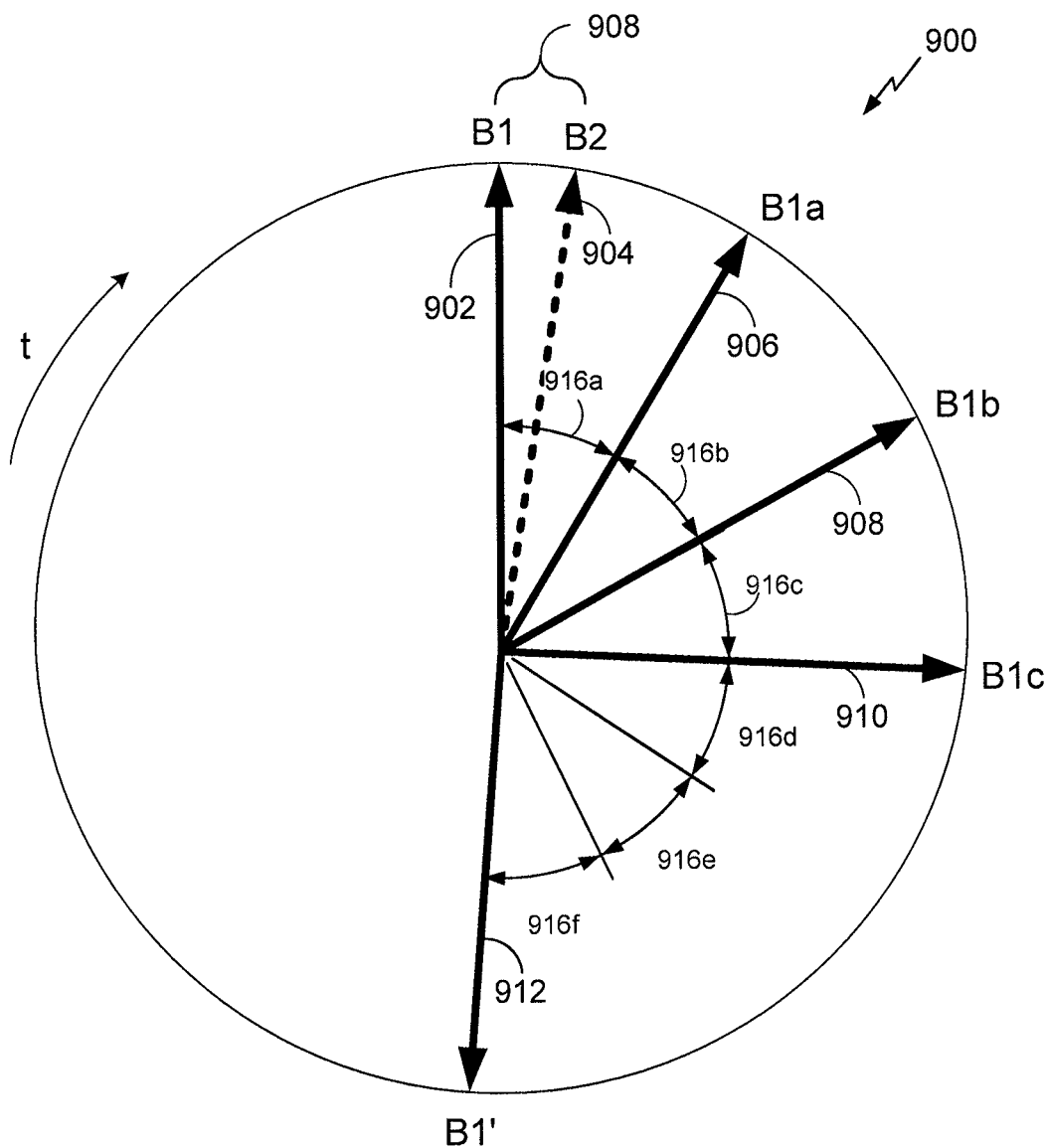
FIG. 9 illustrates another exemplary technique for adjusting a target beacon transmission timing of an access point.

FIG. 9 depicts a timing diagram indicating a beacon timing cycle, generally designated 900, further illustrating another exemplary technique for adjusting target beacon transmission timing of an AP. Time increases clockwise around the timing cycle 900. An original target beacon transmission time B1 of a beacon transmitted from AP1 is illustrated by arrow 902. A target beacon transmission time B2 of a beacon transmitted from a second neighboring AP2 is illustrated by arrow 904. A beacon report 506 may be received by AP1 from a STA1 that includes information identifying the beacon timing of AP2, including the time offset 908 between the beacon transmitted at time B1 and the beacon transmitted at time B2. As described above, AP1 may determine whether to adjust its target beacon transmission time based on the time offset 908. If AP1 determines that an adjustment is necessary, it may adjust its beacon timing by shifting the target beacon transmission time B1 by a shift duration 916 (shown as shift durations 916a-916f) over multiple time shift intervals for a period of time until a final target beacon transmission time B1' is achieved. As described herein, one "time shift interval" may be equivalent to one revolution of the timing diagram of FIG. 9, or one complete beacon timing cycle 900, as illustrated.

For example, AP1 may shift the target beacon transmission time B1 by a shift duration 916 every time shift interval until the beacon timing reaches the final target beacon transmission time B1'. For example, AP1 may shift its target beacon transmission time B1 a first shift duration 916a to target beacon transmission time B1a represented by arrow 906. After another time shift interval, AP1 may then shift the target beacon transmission time a second shift duration 916b from B1a to B1b represented by arrow 908. After a third time shift interval, AP1 may shift the target beacon transmission time a third shift duration 916c from target beacon transmission time B1b to target beacon transmission time B1c represented by arrow 910. AP1 may continue to shift the target beacon transmission time the shift duration 916 at each time shift interval until the final target beacon transmission time B1' is achieved, represented by arrow 912. In some aspects, the final target beacon transmission time B1' may be chosen such that B1' is as far apart in time from B2 as possible, or as far apart as possible from the beacon transmission times of all of the other APs if more APs exist on the network. In some aspects, the final target beacon transmission time BF may be chosen using a single large random or predetermined time shift relative to the original target beacon transmission time B1.

Adjustment of the beacon timing using the techniques described above allows the beacon transmissions to be distributed among the APs across the network and operates to reduce the medium occupancy of the channel, thus reducing collision, latency, and power consumption. The techniques described herein may further be used to separate more than two target beacon transmission times from AP1 and AP2, further distributing additional beacon transmission times about a given timing cycle 900.

Figure 10:
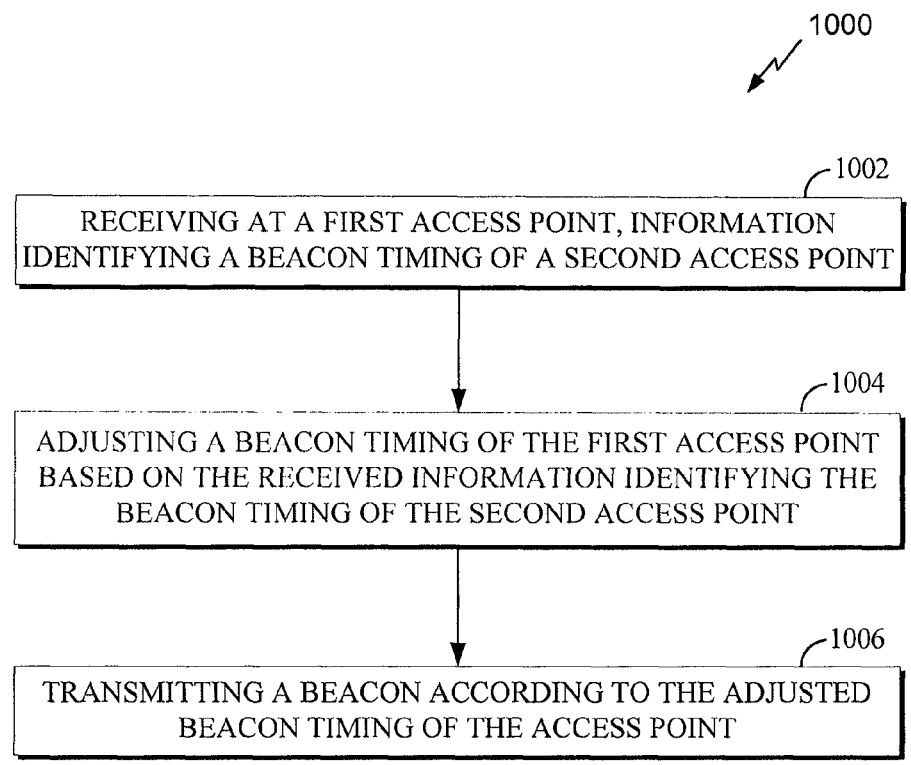
FIG. 10 is a flowchart of an exemplary process of wireless communication that may be employed within the wireless communication system of FIG. 1A and/or FIG. 1B.

FIG. 10 is a flowchart of an exemplary process 1000 of wireless communication that may be employed within the wireless communication system of FIG. 1A and FIG. 1B. The process 1000 may be used to adjust the target beacon transmission timing of one or more APs as discussed, for example, in the description above. Although the process 1000 may be described below with respect to the elements of the wireless device 202, those having ordinary skill in the art will appreciate that other components may be used to implement one or more of the steps described herein.

The process 1000 begins at block 1002 where a first AP, e.g., AP1 receives information identifying a beacon timing of a second access point, e.g., AP2. For example, AP1 may receive a beacon report 506 from a STA, e.g., STA1 associated with AP1 including a time offset 514 between a beacon received by the STA1 from AP2 and a beacon received by the STA1 from the AP1. The reception may be performed by the receiver 212 or the transceiver 214, for example. At block 1004, the process 1000 continues by adjusting a beacon timing of AP1 based on the received information identifying the beacon timing of AP2. For example, the beacon timing of AP1 may be adjusted to be offset from the beacon timing of the AP2 based on the received information. As described above, an access point may adjust its beacon timing so that its beacon is transmitted at a specific time that is farthest in time from all neighboring beacon transmissions (e.g., a minimum threshold distance from the beacon timing of the second access point), by shifting its target beacon transmission time by a random amount of time (e.g., a random time shift selected by the device 202) relative to the current beacon timing, and/or by shifting the target beacon transmission time by a time shift duration over multiple time shift intervals (e.g., shift duration 916) for a fixed period of time until a final target beacon transmission time is achieved, similar to time B1' of FIG. 9. At block 1006, the process 1000 continues by transmitting a beacon according to the adjusted beacon timing, e.g., time B1', of the access point. The transmission may be performed by the transmitter 210 or the transceiver 214, for example.

In some aspects, the process 1000 may receive the information identifying the beacon timing of the AP2 from a wireless communication device in communication with AP1 and AP2. For example, AP1 may receive the information from a STA1 that is associated with the AP1 and that receives signals from the AP2. In some aspects, the process 1000 includes transmitting a request frame to the wireless communication device requesting the information identifying the beacon timing of the second access point AP2. In certain aspects, the process 1000 includes receiving the information identifying the beacon timing of AP2 from AP2 itself. For example, AP1 may receive the information from AP2 via a backhaul communication (e.g., using the Internet or a public switched telephone network (PSTN)).

In some aspects, the process 1000 may include receiving other information related to AP2 including at least one of a basic service set identifier, a service set identifier, and a received signal strength indication and may further include adjusting the beacon timing of the access point based on the other information related to AP2. The basic service set identifier, service set identifier, and received signal strength indication may be used to identify AP2 for which the information identifying the beacon timing refers.

In certain aspects, the process 1000 includes transmitting a notification to at least AP2 and a wireless communication device in communication with AP1 and AP2, the notification indicating a predetermined time when AP1 is going to adjust its beacon timing. For example, as described above, an access point may transmit an adjustment notification 508 to the STA1, or multiple STAs on the network or may transmit the notification 508 directly to multiple other access points on the network via a backhaul communication. In some aspects, the adjusted beacon timing includes a time offset relative to the beacon timing before the adjustment of the beacon timing of the access point. In some aspects, the process 1000 includes transmitting the notification 508 for a period of time equal to at least a maximum sleep duration or listen interval of the wireless communication device associated with the AP1 or at least within range of the transmission.

The adjusted target beacon transmission times may lead to better distribution of the beacon transmission across the network. As a result distributed beacon transmissions, the medium occupancy of the channel is reduced, which in turn reduces collision, latency, and power consumption of devices on the network.

Figure 11:
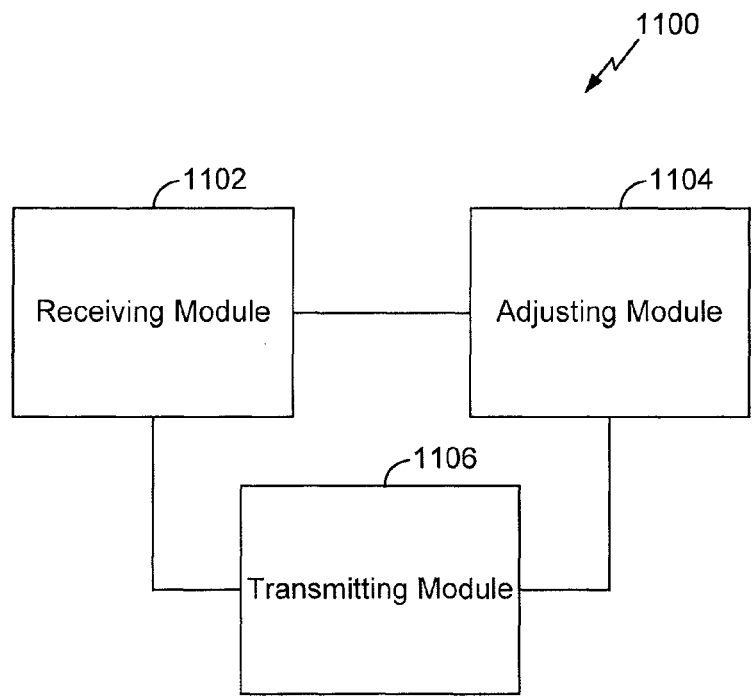
FIG. 11 is a functional block diagram of an exemplary wireless device that may be employed within the wireless communication system of FIG. 1A and/or FIG. 1B.

FIG. 11 is a functional block diagram of an exemplary wireless device 1100 that may be employed within the wireless communication system of FIG. 1A and FIG. 1B. The wireless device 1100 may include an AP, such as AP1. The wireless device 1100 may include a receiving module 1102 for receiving information identifying a beacon timing of a second access point, AP2. The receiving module 1102 may be configured to perform one or more functions discussed above with respect to block 1002 of FIG. 10. The receiving module 1102 may correspond to receiver 212, transceiver 214, or memory 206. The wireless device 1100 may further include an adjusting module 1104 for adjusting a beacon timing of the access point AP1 based on the received information identifying the beacon timing of the second access point AP2. The adjusting module 1104 may be configured to perform one or more functions discussed above with respect to block 1004 of FIG. 10. The adjusting module 1104 may correspond to processor unit(s) 204, memory 206, or BTA module 230. The wireless device 1100 may further include a transmitting module 1106 for transmitting a beacon according to the adjusted beacon timing of the access point AP1. The transmitting module 1106 may be configured to perform one or more functions discussed above with respect to block 1006 of FIG. 10. The transmitting module 1106 may correspond to transmitter 210, transceiver 214, or memory 206.

Figure 12:
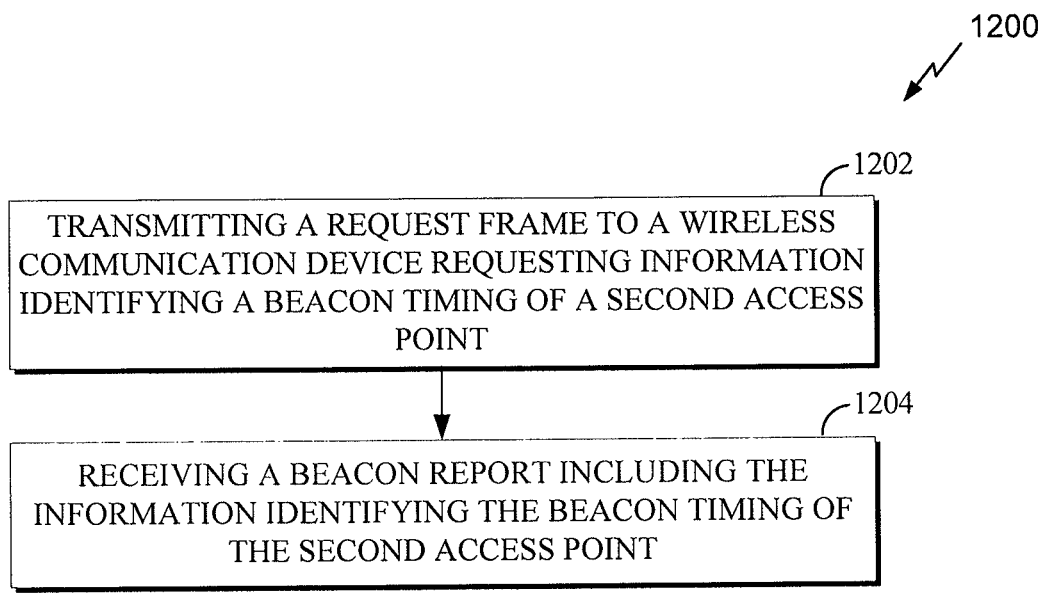
FIG. 12 is a flowchart of an exemplary process of wireless communication that may be employed within the wireless communication system of FIG. 1A and/or FIG. 1B.

FIG. 12 is a flowchart of an exemplary process 1200 of wireless communication that may be employed within the wireless communication system of FIG. 1A and FIG. 1B. The process 1200 may be used to receive information from a wireless communication device for adjusting the target beacon transmission timing of one or more APs as discussed, for example, in the description above. Although the process 1200 may be described below with respect to the elements of the wireless device 202, those having ordinary skill in the art will appreciate that other components may be used to implement one or more of the steps described herein.

The process 1200 begins at block 1202 by transmitting a request frame from a first access point AP1 to a wireless communication device requesting information identifying a beacon timing of a second access point AP2. The transmission may be performed by the transmitter 210 or the transceiver 214, for example. At block 1204, the process 1200 continues by receiving a beacon report 506 including the information identifying the beacon timing of the second access point, AP2. For example, an access point AP1 may receive a beacon report 506 from a STA1 or other wireless communication device associated with AP1 including a time offset 514 between a first beacon received by the STA1 from the AP2 and a second beacon received by the STA1 from AP1, similar to that illustrated by FIG. 5. The reception may be performed by the receiver 212 or the transceiver 214, for example.

In some aspects, the process 1200 may further include adjusting a beacon timing of the access point AP1 based on the received information identifying the beacon timing of the second access point AP2 and transmitting a beacon according to the adjusted beacon timing of the access point AP1.

In some aspects, the process 1200 may include adjusting the beacon timing of the access point AP1 so that the beacon timing is a minimum threshold distance from the beacon timing of the second access point AP2. In some aspects, the process 1200 may include adjusting the beacon timing of the access point AP1 by applying a random time shift to the beacon timing. In some aspects, the process 1200 may include adjusting the beacon timing of the access point AP1 by periodically shifting the beacon timing by a fixed amount at a fixed time until the beacon timing reaches a target beacon timing, such as that described in FIG. 9.

In some aspects, the process 1200 may include transmitting by a first access point AP1, a notification, to at least one of the second access point AP2 and the wireless communication device STA1, the notification indicating a predetermined time when the access point is going to adjust the beacon timing of the access point and the adjusted beacon timing. In some aspects, the adjusted beacon timing includes a time offset relative to the beacon timing before the adjustment of the beacon timing of the access point AP1. In some aspects, the process 1200 includes transmitting the notification for a period of time equal to at least a maximum sleep duration or listen interval of at least one wireless communication device STA1.

As described above, the adjusted beacon timing leads to the beacon transmissions being better distributed and the medium occupancy of the channel being reduced, which in turn reduces collision, latency, and power consumption of devices on the network.

Figure 13:
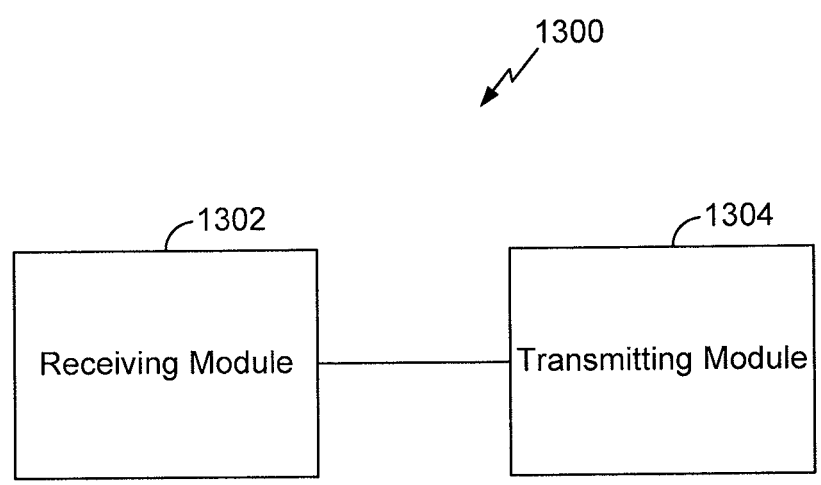
FIG. 13 is a functional block diagram of an exemplary wireless device that may be employed within the wireless communication system of FIG. 1A and/or FIG. 1B.

FIG. 13 is a functional block diagram of an exemplary wireless device 1300 that may be employed within the wireless communication system of FIG. 1A and FIG. 1B. The wireless device 1300 may include an AP. The wireless device 1300 may include a transmitting module 1304 for transmitting a request frame by a first access point AP1 to a wireless communication device requesting information identifying a beacon timing of a second access point AP2. The transmitting module 1304 may be configured to perform one or more functions discussed above with respect to block 1202 of FIG. 12. The transmitting module 1304 may correspond to transmitter 210, transceiver 214, or memory 206. The wireless device 1300 may further include a receiving module 1302 for receiving a beacon report 506 including the information identifying the beacon timing of the second access point AP2. The receiving module 1302 may be configured to perform one or more functions discussed above with respect to block 1204 of FIG. 12. The receiving module 1302 may correspond to receiver 212, transceiver 214, or memory 206.

Moreover, other modules may be included in the wireless device 1300, such as an adjusting module for adjusting a beacon timing of the access point AP1 based on the received information identifying the beacon timing of the second access point AP2. The adjusting module 1304 may correspond to processor unit(s) 204, or memory 206. The transmitting module 1304 may further be configured to and may transmit a beacon according to the adjusted beacon timing of the access point AP1.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A first access point for wireless communication, the first access point comprising:
   a transmitter configured to transmit a first beacon in accordance with a first beacon transmission timing; and
   a processor configured to adjust the first beacon transmission timing based at least in part on information indicative of a second beacon transmission timing of a second access point, such that the adjusted first beacon transmission timing is at least a particular distance in time away from the second beacon transmission timing,
   and to maintain the first beacon transmission timing if the time between the first beacon transmission timing and the second beacon transmission time is larger than the particular distance,
   wherein the transmitter is further configured to transmit a second beacon according to the adjusted first beacon transmission timing.

2. The first access point of claim 1, further comprising a receiver configured to receive the information indicative of the second beacon transmission timing via a data message from a wireless communication device in communication with at least the first access point and the second access point.

3. The first access point of claim 2, wherein:
   the transmitter is further configured to transmit a request frame to the wireless communication device requesting information identifying the second beacon transmission timing, and wherein
   the receiver is further configured to receive, after transmitting the request frame, the data message from the wireless communication device.

4. The first access point of claim 1, wherein the information indicative of the second beacon transmission timing further comprises an indication of a time offset between a third beacon received by a wireless communication device from the first access point and a fourth beacon received by the wireless communication device from the second access point.

5. The first access point of claim 1, wherein the processor is further configured to adjust the first beacon transmission timing by applying a time shift to the first beacon transmission timing.

6. The first access point of claim 1, wherein the transmitter is further configured to transmit a notification to at least one of the second access point or a wireless communication device in communication with the first access point and the second access point, the notification indicating:
   a predetermined time when the first access point will adjust the first beacon transmission timing, and
   the adjusted beacon transmission timing.

7. A method of wireless communication, comprising:
transmitting, by a first access point, a first beacon in accordance with a first beacon transmission timing;
adjusting, by the first access point, the first beacon transmission timing based at least in part on information indicative of a second beacon transmission timing of a second access point, such that the adjusted first beacon transmission timing is at least a particular distance in time away from the second beacon transmission timing;
maintaining the first beacon transmission timing if the time between the first beacon transmission timing and the second beacon transmission time is larger than the particular distance; and
transmitting a second beacon according to the adjusted first beacon transmission timing.

8. The method of claim 7, further comprising:
receiving the information indicative of the second beacon transmission timing via a data message from a wireless communication device in communication with at least the first access point and the second access point.

9. The method of claim 8, further comprising:
transmitting, by the first access point, a request frame to the wireless communication device, the request frame requesting information identifying the second beacon transmission timing; and
receiving after transmitting the request frame, the data message from the wireless communication device.

10. The method of claim 7, wherein the information indicative of a second beacon transmission timing further comprises an indication of a time offset between a third beacon received by a wireless communication device from the first access point and a fourth beacon received by the wireless communication device from the second access point.

11. The method of claim 7, further comprising:
adjusting the first beacon transmission timing by applying at least one of a time shift to the first beacon transmission timing.

12. The method of claim 7, further comprising:
transmitting a notification to at least one of the second access point or a wireless communication device in communication with the first access point and the second access point, the notification indicating:
a predetermined time when the first access point will adjust the first beacon transmission timing of the first access point, and
the adjusted first beacon transmission timing.

13. A first access point for wireless communication, the first access point comprising:
means for transmitting a first beacon in accordance with a first beacon transmission timing;
means for adjusting the first beacon transmission timing based at least in part on information indicative of a second beacon transmission timing of a second access point, such that the adjusted first beacon transmission timing is at least a particular distance in time away from the second beacon transmission timing;
means for maintaining the first beacon transmission timing if the time between the first beacon transmission timing and the second beacon transmission time is larger than the particular distance; and
means for transmitting a second beacon according to the adjusted first beacon transmission timing.

14. The first access point of claim 13, further comprising:
means for receiving the information indicative of the second beacon transmission timing via a data message from a wireless communication device in communication with at least the access point and the second access point.

15. The first access point of claim 14, further comprising:
means for transmitting a request frame to the wireless communication device requesting information identifying the second beacon transmission timing; and
means for receiving after transmitting the request frame, the data message from the wireless communication device.

16. The first access point of claim 13, wherein the information indicative of the second beacon transmission timing further comprises an indication of a time offset between a third beacon received by a wireless communication device from the first access point and a fourth beacon received by the wireless communication device from the second access point.

* * * * *